United States Patent
Jeong et al.

(10) Patent No.: US 6,768,489 B2
(45) Date of Patent: Jul. 27, 2004

(54) METHOD FOR CONTROLLING A POSTURE OF AN ARTICULATED OBJECT IN AN ANIMATION PRODUCTION

(75) Inventors: Ii-Kwon Jeong, Daejeon (KR); Ji Hyung Lee, Daejeon (KR); Chang Joon Park, Daejeon (KR); Do-Hyung Kim, Daejeon (KR); Seung Woo Nam, Daejeon (KR); In Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 253 days.

(21) Appl. No.: 10/166,617

(22) Filed: Jun. 12, 2002

(65) Prior Publication Data

US 2003/0122831 A1 Jul. 3, 2003

(30) Foreign Application Priority Data

Dec. 28, 2001 (KR) ........................................ 2001-86982

(51) Int. Cl.$^7$ ............................................. G06T 13/00
(52) U.S. Cl. ..................................................... 345/474
(58) Field of Search ................................. 345/649, 672, 345/473, 474, 956, 957, 958, 959, 960

(56) References Cited

U.S. PATENT DOCUMENTS

| 5,692,117 A | * | 11/1997 | Berend et al. | ............... 345/475 |
| 5,883,638 A | * | 3/1999 | Rouet et al. | ................ 345/473 |
| 5,889,528 A | | 3/1999 | Jhao | |
| 6,317,651 B1 | | 11/2001 | Gerstenberger et al. | |

FOREIGN PATENT DOCUMENTS

KR 9937933 5/1999 ........... G06T/17/00

\* cited by examiner

Primary Examiner—Almis R. Jankus
(74) Attorney, Agent, or Firm—Jacobson Holman PLLC

(57) ABSTRACT

In a method for controlling a posture of an articulated object, a user inputs an initial configuration of the object, a base point, an end point, a target point and a method for updating the posture. It is determined whether the number of joints positioned between the base and the end points is larger than or equal to three. If the number is smaller than or equal to two, it is determined whether the method for updating the posture is a two-segment or three-segment based method or another method for moving an intermediate end point. If the method is two-segment or three-segment based, the number is rechecked. If the number is smaller than or equal to two, the posture is modified according to the two-segment or three-segment based method. If the posture satisfies a predetermined condition, it is displayed on a screen.

5 Claims, 4 Drawing Sheets

FIRST STEP

SECOND STEP

METHOD FOR CONTROLLING A POSTURE OF AN ARTICULATED OBJECT IN AN ANIMATION PRODUCTION

FIELD OF THE INVENTION

The present invention relates to a method for an animation production; and, more particularly, to a method for controlling a posture of an articulated object by performing a mathematical calculation, in stead of using a numerical analysis or an optimization, in an animation production.

BACKGROUND OF THE INVENTION

Recently, the Internet is commonly used as a communication network where a virtual environment can be constructed. Further, there are ever-increasing demands for developing technologies for avatars representing users in the virtual environment.

Such avatar technologies are based on the animation of human gestures that have been the center of interests in computer graphics field for a long time. Further, as the performance of computers improves, there have been widely used animations produced by using the three-dimensional graphics technologies based on the three-dimensional model of human. Particularly, the technologies for controlling the posture of an articulated object, which is based on the inverse kinematics, are very important in practice as well as in theory.

According to the prior art, the technologies for controlling the posture can be categorized into two types. One is a key-frame method based on a manual operation. The other is a method based on the inverse kinematics.

In the key-frame method, a user modifies the posture of an articulated object manually or by using an editing software tool. However, this method has a problem that the edition of the posture is time-consuming and far from intuition of the user.

Meanwhile, the inverse kinematics-based method calculates automatically an angle at each of joints of the articulated objects if a base point, an end point and a target point are set. Using the angle at each of the joints, the end point can be moved toward the target point. The inverse kinematics is more intuitive than the key-frame method. Further, the inverse kinematics is more widely used in the computer graphics field. The inverse kinematics-based method can be further categorized into several types: an analytic method based on a mathematical calculation; a numerical analysis method based on the Jacobian matrix; and a method based on an optimization.

The method based on a mathematical calculation is used only for manipulating an articulated object having two segments.

The Jacobian matrix is referred to a matrix representing rates at which the end point changes according to the changes of angles at the joints. The inverse kinematics can be realized by using a pseudo-inverse of the Jacobian matrix. However, the calculation of the pseudo-inverse of the Jacobian matrix requires differential calculus. Further, it is not guaranteed that the pseudo-inverse of the Jacobian matrix can always be found.

The method based on an optimization is to find an optimized joint angle so that the distance between the end point and the target point can be minimized. This method is also time-consuming. Also, it is not guaranteed that the optimized solution can always be found.

SUMMARY OF THE INVENTION

It is, therefore, an object of the present invention to provide a method for controlling the posture of an articulated object, which is represented in a hierarchical structure, in real time by using the inverse kinematics so that an end point moves toward a target point when a user inputs a base point, an end point and the target point being represented by each of joints of the articulated object, respectively.

In accordance with a preferred embodiment of the present invention, there is provided a method for controlling a posture of an articulated object in an animation production system, including the steps of: (a) inputting an initial configuration of the articulated object, a base point, an end point, a target point and a method for updating the posture; (b) determining whether the number of joints to be controlled between the base point and the end point is larger than or equal to three; (c) determining whether the method for updating the posture is a two-segment based or three-segment based method or another method when the number of the joints is smaller than or equal to two in the step (b); (d) determining the number of joints to be controlled between the base point and the end point when the method for updating the posture is the two-segment based or three-segment based method in the step (c); (e) performing a modification of the posture of the articulated object according to the two-segment based or three-segment based method when the number of the joints is smaller than or equal to two in the step (d); and (f) displaying the modified posture of the articulated object according to the two-segment based or three-segment based method on a screen when the modified posture thereof satisfies a predetermined terminal condition.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

Preferred embodiments of the present invention will now be described in detail with reference to the accompanying drawings.

Figure 1:
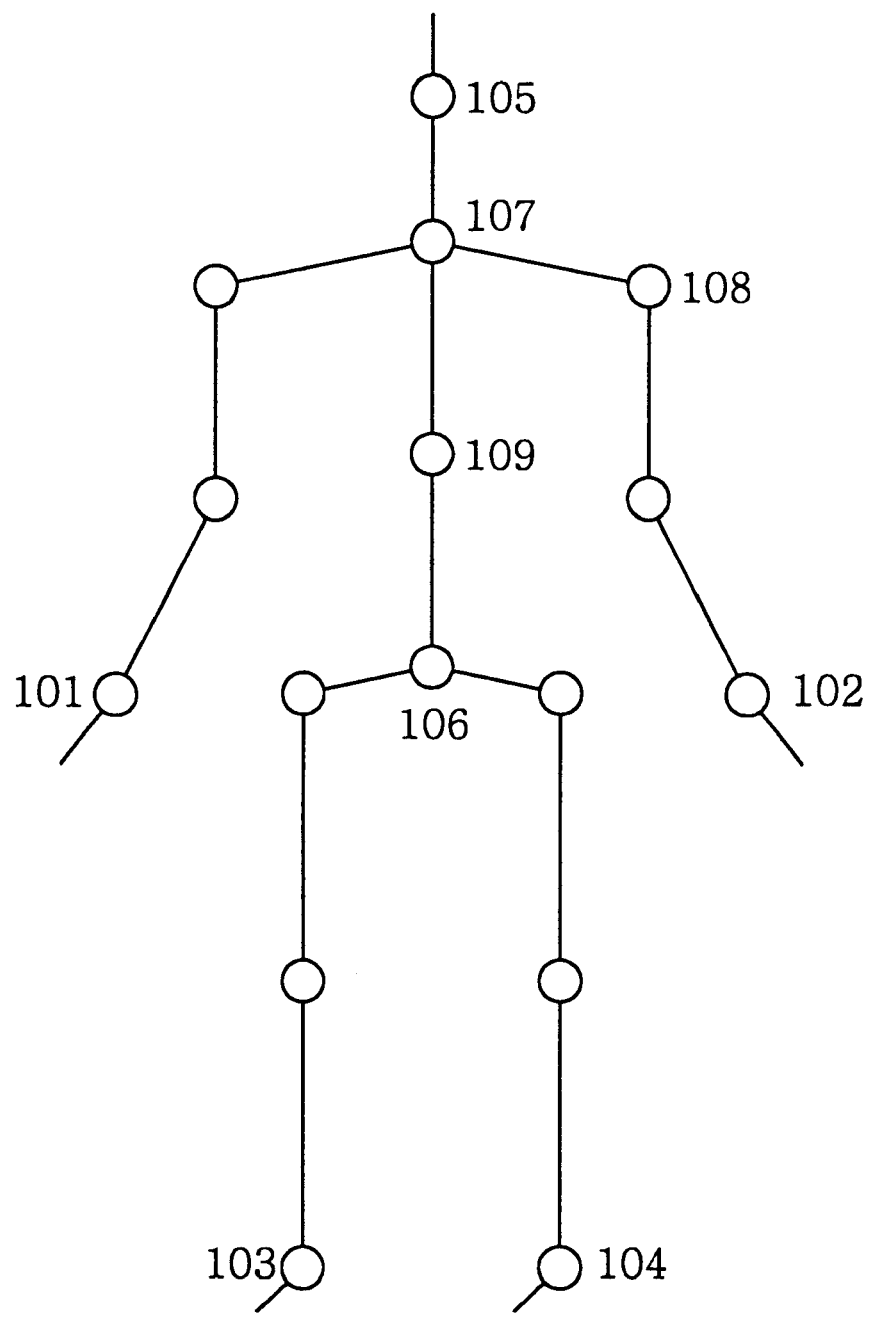
FIG. 1 illustrates a schematic diagram of a human body for the sake of an explanation for a method for controlling a posture of an articulated object in accordance with a preferred embodiment of the present invention.

FIG. 1 illustrates a schematic diagram of an articulated object for the sake of an explanation for a method for controlling a posture of a human body.

The articulated object representing a human body includes a right wrist 101, a left wrist 102, a right ankle 103, a left ankle 104, a head 105, a root 106, a neck joint 107, a shoulder joint 108 and a waist 109.

Each of a base point, an end point, a target point and an intermediate end point, which are used in a process of controlling a posture of the articulated object in animation, can be assigned to one of the joints 101 to 109. However, it is understood by those skilled in the art that the present invention can be applied even when each of the points is assigned to another joint included in the articulated object.

The process of controlling a posture of the articulated object shown in FIG. 1 will be described with reference to FIGS. 2A and 2B.

Figure 2A:
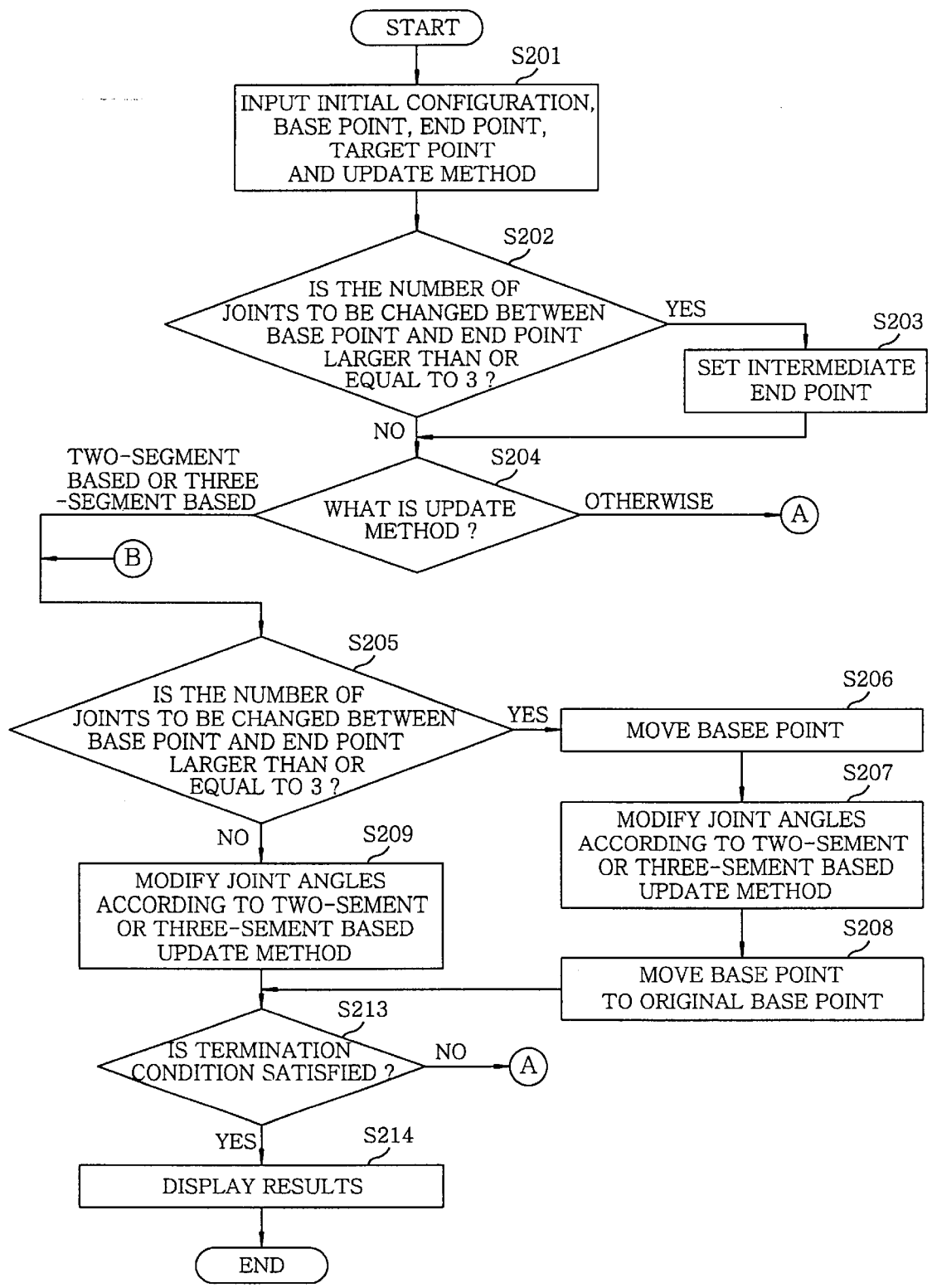
FIGS. 2A and 2B exhibit a flowchart for showing the process of modifying a posture of an articulated object in accordance with the present invention.
Figure 2B:
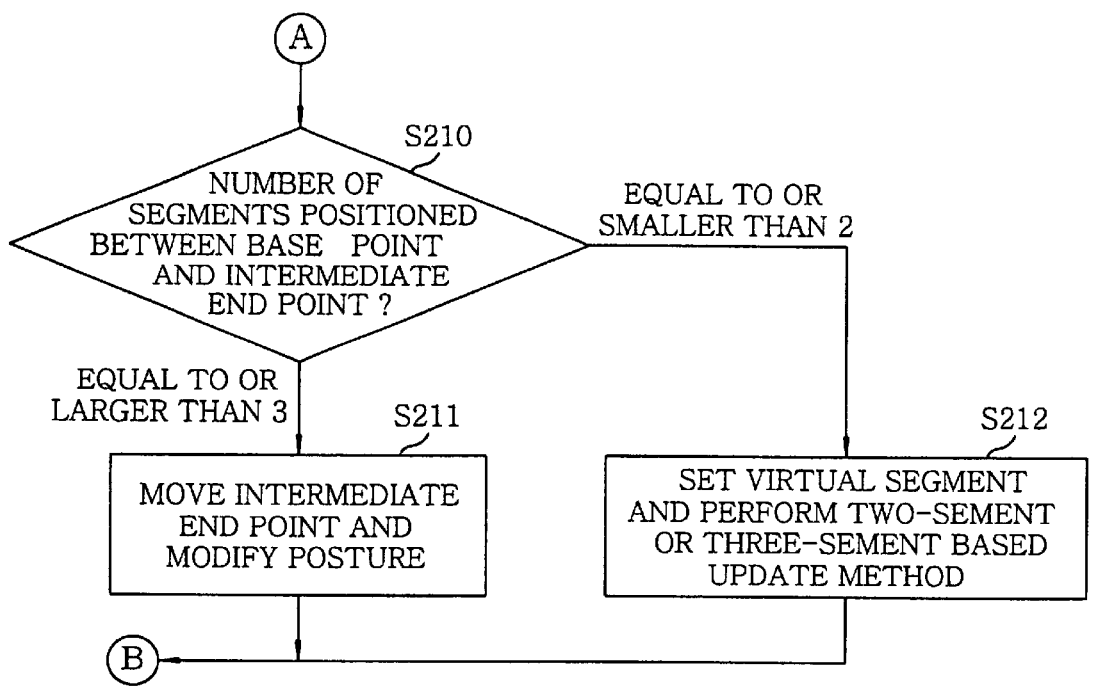

As shown in FIG. 2A, a user of an animation production system inputs an initial configuration of the articulated object, a base point, an end point, a target point and an update method (step 201).

The initial configuration of the articulated object is represented by using an angle at each of the joints of the articulated object. Any configuration of the articulated object can be represented by using an angle at each of the joints. Each of the inputted base point and end point represents one of the joints included in the object. The method of the present invention modifies the posture of the object by determining angles at joints positioned between the base point and the end point including the base point.

Next, the animation production system checks if the number of joints to be changed between the base point and the end point is larger than or equal to three (step 202). If the number of the joints is smaller than or three, there is no need to set an intermediate end point. Otherwise, i.e., if the number of the joints is larger than or equal to three, the animation production system finds a virtual base point (by moving from the original base point toward the end point) so that the number of joints to be changed is two or three. Here, the virtual base point is determined so that the number of joints to be changed is two if the end point is assigned to the wrist or the ankle of the object; and three if the end point is assigned to the head of the object. This is because the movement of a hand or a foot is most active in two joints at the end thereof. The virtual base point is set as an intermediate end point (step 203).

If the number of joints to be changed between the base point and the end point is smaller than or equal to two, the animation production system performs the step 204.

The animation production system determines whether the user selects a two-segment based or three-segment based update method or not (step 204).

If the user select the two-segment based or three-segment based method, the animation production system checks if the number of joints to be changed between the base point and the end point is larger than or equal to three (step 205).

In the step 205, if the number of the joints is larger than or equal to three, the animation production system moves the base point toward the end point until the number of joints to be changed becomes two or three (step 206) Next, the modification of the angles of the joints is performed according to the two-segment based or three-segment based update method, and then the moved base point is moved back to the original base point (step 207, step 208).

The animation production system checks if the modified posture of the articulated object satisfies a predetermined termination condition (step 213). Here, the termination condition can be determined by the user. For instance, the modification of the posture can be terminated when the end point reaches the target point or when no more movement of the end point can be obtained after the process shown in FIG. 2A is performed twice.

In the step 213, if the modified posture of the articulated object does not satisfy the predetermined termination condition, the animation production system performs the step 210 and the succeeding steps. Otherwise, i.e., if the modified posture of the articulated object satisfies the predetermined termination condition, the animation production system displays the modified posture of the articulated object, the angle values of the joints changed and the names of the joints on a screen thereof (step 214).

In the step 205, if the number of the joints is smaller than or equal to two, the modification of the angles of the joints is performed according to the two-segment based or three-segment based method (step 209). And then, the animation production system proceeds to the step 213.

Figure 3:
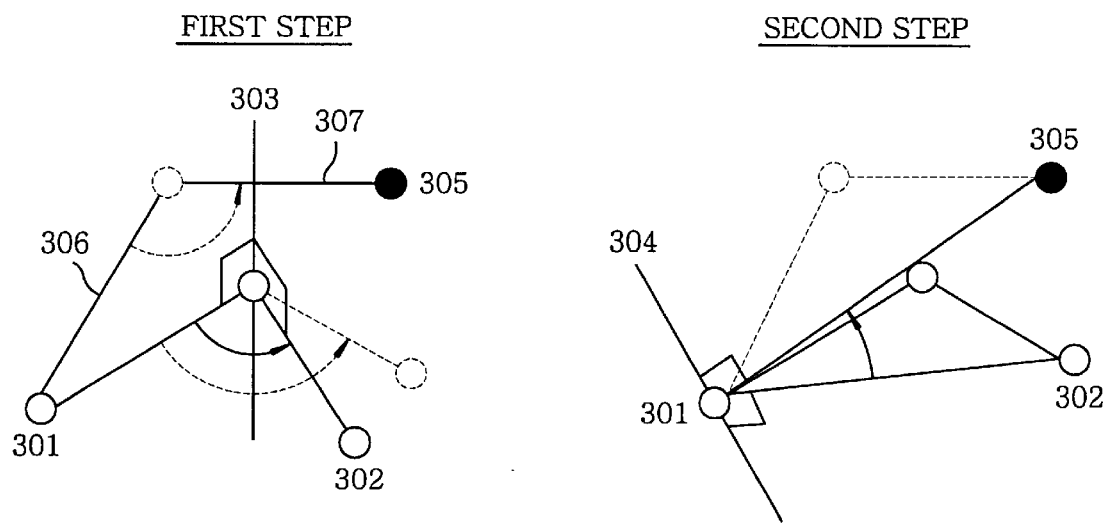
FIG. 3 depicts a schematic diagram for showing the process of modifying a posture of an articulated object having two segments.

Referring to FIG. 3, the method for controlling a posture of an articulated object having two segments used in the present invention solves a problem of two-segment based kinematics by using two steps, which is similar in principle to a conventional method for controlling the posture of the object having two segments. In a first step, based on the distance between a base point 301 and a target point 305, an angle value of an intermediate joint (point) positioned between the base point 301 and the end point 305 is obtained by using a simple trigonometric function. As a special case, i.e., if the distance between the base point 301 and the target point 305 is smaller than a difference of the lengths of two segments 306 and 307 or larger than a sum of the lengths thereof, the two joints are completely folded or unfolded, respectively. A rotation axis 303 of the intermediate joint is assumed to be a straight line perpendicular to a plane where the three joints are located, the straight line passing through the intermediate joint.

This is based on an assumption that a given initial configuration of the articulated object is already in a natural state, the intermediate point is either an elbow joint or a knee joint and its degree of freedom is 1 since the modification of the posture of the object having two segments is mainly performed at a hand or a foot.

In a second step, an end point 302 is moved to the target point 305 by rotating centering on a rotation axis 304 of the base joint. In this case, the rotation axis 304 is a straight line perpendicular to a plane where the target point 305, the end point 302 and the base point 301 are located, the straight line passing through the base joint.

Figure 4:
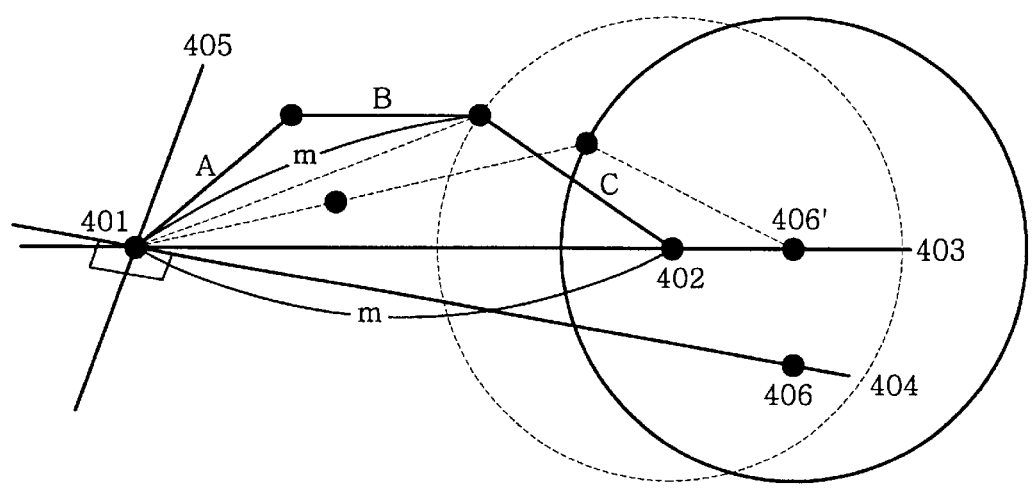
FIG. 4 charts a schematic diagram for showing the process of modifying a posture of an articulated object having three segments.

As illustrated in FIG. 4, the method for modifying a posture of an articulated object having three segments used in the present invention present a solution to a problem of the three-segment based inverse kinematics by using two steps.

As shown in FIG. 4, segments connected between a base point 401 and an end point 402 are labeled as A, B and C in order. Further, lengths of the segments are assumed to be a, b and c, respectively. A distance from the base point 401 to a joint of the segment B, the joint being positioned in the direction of the end point 402, is labeled as m. FIG. 4 is assumed to depict an orthographic projection of the segments on a plane where the segment C and the base point 401 are located.

Therefore, a length of the segment C shown in FIG. 4 is same as the original length c. A location of a virtual target point 406' on an initial reference line 403 connecting the base point 401 and the end point 402 is determined by using the distance from the base point 401 to a target point 406.

If the distance from the base point 401 to the virtual target point 406' is larger than a+b+c, each of the segments A, B and C should be stretched in a straight line along the initial reference line 403. In this case, a second step is performed without following processes. A circle having a radius of c is drawn centering on the virtual target point 406', and a circle having a radius of m is drawn centering on the reference point 401. Then, it is checked whether each of the circles intersects each other or not. When there is no intersection, one circle contains another one or the circle having a radius of m does not reach another one.

When one circle contains another one, the segments A and B should be more folded. In this case, an end point of the segment B is determined to be a certain point on the circle centering on the virtual target point 406'. And then, the modification of the posture of the object having two segments is applied to the segments A and B, such that new positions of the segments A and B are determined and a second step is performed. When a circle does not reach another one, the segments A and B should be more stretched. New positions thereof are determined by selecting a certain point on the circle centering on the virtual target point 406' as the action point and applying the modification of the posture of the object having two segments.

In this case, the distance from the action point on the circle to the reference point 401 should not be larger than a+b. When there is an intersection between two circles, new positions of the segments A and B can be obtained by modifying the position of the segment C but not those of the segments A and B. However, if necessary, the modification of the posture of the object having two segments can be applied by selecting a new point on the circle centering on the virtual target point 406'.

In the second step of the modification of the posture of the object having three segments, the end point 402 points to the target point 406. The position of the segment C coincides with a line segment connecting the virtual target point 406' and the one end of the segment B. An angle value of the base joint necessary to make the end point meet the target point can be obtained by using a simple trigonometric function. Here, a rotation axis 405 of the base joint is a straight line perpendicular to a plane where the base point 401, the virtual target point 406' and the target point 406 are located. Also, it passes through the base point 401. If the base joint rotates as much as the angle value, the end point 402 meets the target point 406.

An angle value of the neck joint 107 tends to be fixed in general movements. Therefore, two segments positioned between the waist 109 and the shoulder joint 108 can be regarded as one segment. Further, the present invention can be easily performed with less calculation when controlling a posture of the upper body having a root as a base point.

When the end point needs to be set at the ends of a hand and a foot, if postures of the ends thereof are set in advance, an end point can be assumed to be assigned to a wrist or an ankle. Thus, the present invention can be applied to such a situation.

In the step 204, when a user does not input the two-segment based or three-segment based method, a movement of an intermediate end point is performed firstly, and then the modification of the posture of the object is performed according to the two-segment based or three-segment based method.

A method that is not the two-segment based or three-segment based is used when a user judges that a movement from a base point to the intermediate end point is important as much as that from the intermediate end point to an end point.

The animation production system checks how many segments exist between the base point and the intermediate end point (step 210).

In the step 210, if the number of segments positioned between the base point and the intermediate end point is smaller than or equal to two, the animation production system assumes one virtual segment to connect the intermediate end point and the end point. In this case, since the number of segments including the virtual segment from the base point to the end point is smaller than or equal to three, the modification of the posture of the object is performed according to the two-segment based or three-segment based method (step 212). Thereafter, the step 205 is performed.

If the number of segments positioned between the base point and the intermediate end point is larger than or equal to three, the animation production system modifies the posture of the object by maintaining the base point and setting the intermediate end point as a new virtual end point (step 211). Thereafter, the step 205 is performed.

Here, if the number of segments positioned between the base point and the virtual action point is smaller than or equal to three, the modification of the posture of the object is performed according to the two-segment based or three-segment based method. On the other hand, if it is larger than or equal to four, the modification of the posture of the object is performed by using the entire modifying process described in the present invention (presented in FIGS. 2A and 2B). In this case, however, a virtual target point is separately set according to a virtual end point. The virtual target point is set to a point on a line segment connecting the intermediate end point and the target point. Here, a user predetermines the location of the virtual target point on the line segment. For example, if the virtual target point is set to the intermediate end point, the virtual end point is not moved after the modification of the posture. If the virtual target point is set to a middle point on the segment, the virtual end point is slightly moved toward a target point. If the virtual target points is set to the target point, the virtual end point is moved to the target point.

Thus, a user can predetermine a degree of the modification of the posture from a base point to an intermediate end point. Generally, it hardly happens that the number of segments positioned between the base point and the intermediate end point is larger than or equal to three since a case that a root is set as a base point is most popular.

According to the present invention as described above, a method for controlling a posture of an articulated object in an animation production is provided by using a method based on mathematical calculation, but not a method based on numerical analysis or a method based on optimization.

Further, a real time implementation is possible since the modification of the posture can be performed based on the mathematical calculation without the numerical analysis. Therefore, a real time modifying technology of the posture of avatars on a virtual environment can be used by providing a simple and fast method for controlling a posture of an object in comparison with a key-frame method requiring a manual operation and intuition, a numerical analytic method using Jacobian and a method based on an optimization.

While the invention has been shown and described with respect to the preferred embodiments, it will be understood by those skilled in the art that various changes and modifications may be made without departing from the spirit and scope of the invention as defined in the following claims.

What is claimed is:

1. A method for controlling a posture of an articulated object in an animation production system, comprising the steps of:

(a) inputting an initial configuration of the articulated object, a base point, an end point, a target point and a method for updating the posture;

(b) determining whether the number of joints positioned between the base point and the end point is larger than or equal to three;

(c) determining whether the method for updating the posture is a two-segment based or three-segment based method or another method when the number of the joints is smaller than or equal to two in the step (b);

(d) determining the number of joints to be controlled between the base point and the end point when the method for updating the posture is the two-segment based or three-segment based method in the step (c);

(e) performing a modification of the posture of the articulated object according to the two-segment based or three-segment based method when the number of the joints is smaller than or equal to two in the step (d); and (f) displaying the modified posture of the articulated object according to the two-segment based or three-segment based method on a screen when the modified posture thereof satisfies a predetermined terminal condition.

2. The method of claim 1, if the number of the joints is larger than or equal to three in the step (b), further comprising the step of:

setting a virtual base point as an intermediate end point by moving the virtual base point from the base point toward the end point so that the number of joints to be changed is two or three.

3. The method of claim 1, if the number of the joints is larger than or equal to three in the step (d), further comprising the steps of:

modifying the base point by moving the base point toward the end point so that the number of joints to be changed is two or three; and moving the modified base point back to the original base point after performing a modification of the posture of the articulated object according to the two-segment based or three-segment based method.

4. The method of claim 1, if the method for controlling the posture is not the two-segment based or three-segment based method in the step (c), further comprising the steps of:

determining the number of segments positioned between the determined intermediate end point and the base point; and setting a virtual segment to connect the intermediate end point and an end point and performing a modification of the posture of the articulated object according to the two-segment based or three-segment based method when the number of segments is smaller than or equal to two, and updating the posture of the articulated object by setting the intermediate end point to a virtual end point when the number of segments is larger than or equal to three.

5. The method of claim 1, wherein the method for updating the posture of the articulated object having three segments in the step (e) includes the step of;

checking an existence of a solution by using an orthographic projection, determining postures of two segments by using a conventional method for updating the posture of the object having two segments, determining postures of remaining segments except the two segments and moving the end point to the target point by calculating a rotation axis of the base point and target angle values of the base point.

* * * * *

UNITED STATES PATENT AND TRADEMARK OFFICE
CERTIFICATE OF CORRECTION

PATENT NO. : 6,768,489 B2
DATED : July 27, 2004
INVENTOR(S) : Il-Kwon Jeong

It is certified that error appears in the above-identified patent and that said Letters Patent is hereby corrected as shown below:

<u>Title page,</u>
Item [75], Inventors, "Ii-Kwon Jeong" should read -- IL-Kwon Jeong --

Signed and Sealed this

Thirty-first Day of August, 2004

JON W. DUDAS
*Director of the United States Patent and Trademark Office*